April 9, 1968   M. KUKOFF   3,377,184
DECORATIVE FABRIC
Filed July 1, 1966

INVENTOR
MILTON KUKOFF
BY
ATTORNEY 3,377,184
DECORATIVE FABRIC
Milton Kukoff, 30 Irma Drive,
Oceanside, N.Y. 11572
Continuation-in-part of application Ser. No. 226,242, Sept. 26, 1962. This application July 1, 1966, Ser. No. 562,295
5 Claims. (Cl. 117—25)

ABSTRACT OF THE DISCLOSURE

A dry-cleanable fabric having a base material with a predetermined open-work design thereon. A multiplicity of polyvinyl chloride particles permanently adhered to the fabric in the predetermined open-work design. The fabric being capable of flexiblity in all directions even with the permanent fixing of the plastic particles thereon. Further the method of making the dry cleanable fabric comprises the steps of applying adhesive to a fabric in a predetermined open-work design, placing polyvinyl chloride particles on the adhesive, heating the adhesive, melting only a portion of the polyvinyl chloride particles in communication with the adhesive so that the particles become integral with the adhesive.

---

This application is a continuation-in-part of my previously filed application Ser. No. 226,242, filed Sept. 26, 1962, which is now abandoned.

This invention relates to decorative articles and more particularly to articles having a decorative bead-like coating thereon and the process of making the same.

In the prior art it has been known to apply beads and bugles, which are the common terms for glass particles of spherical and tubular shape, to a fabric in a decorative manner. Such application was and still is normally accomplished by sewing the individual glass particles onto the fabric. This process for fastening the glass beads to the fabric and the use of glass in itself gives rise to several problems. First of all, the glass beads and bugles are relatively expensive and the high labor cost of sewing them to the fabric makes the cost of the finished article extremely high. Additionally, the glass beads, when applied over a relatively large area make the fabric stiff and hard to handle, drape or sew. Also, when a thread breaks on one bead, a whole group of beads usually come loose and spoil the decorative effect. Further, glass beaded fabrics are difficult, if not impossible, to wash.

In general, because of the high cost involved and because glass is heavy, decorative patterning, such as of the embroidery type, on fabric by the use of glass particles is kept at a minimum. Large massive patterns are not usually applied to lightweight fabrics because the weight of the glass adversely affects the drape of the cloth, the latter being important in wearing apparel. Also, it is difficult to achieve fine-line embroidery designs and uniformity in repeating designs since such designs are limited by the size and inflexibility of the glass beads as well as by the hand work which must be done by the operator. As another disadvantage, the use of glass beads makes cutting and stitching of the fabric pieces very difficult since the glass will break needles and knives.

In the present invention, a decorative beaded or bugled article is provided which does not have the various disadvantages presented by the glass particles. The article is produced with a beaded decorative surface by the use of plastic particles, which may be applied in any desired pattern, including fine line, open-work designs, the plastic particles being held to the material by interaction with an adhesive which is applied to the material in a specified manner. The adhesive used is such that the finished article is dry cleanable and/or washable.

In accordance with the invention, pieces of plastic, preferably polyvinyl chloride plastic, are cut into small bead-like pieces or particles. The plastic particles may be of any desired shape or color. The base material to which the plastic beads are to be applied, is coated with a suitable adhesive, preferably a plastisol, in a desired pattern and the plastic beads are applied or flocked onto the wet adhesive. The excess plastic beads are then shaken off and the adhesive is cured to fixedly set it to the base material and to hold the plastic particles to the adhesive. During the curing of the adhesive, which is normally effected by the application of heat, the plastic beads are preferably melted slightly so that they fuse with and become permanently fixed to the adhesive.

In a preferred embodiment of the invention, an adhesive is utilized which can be applied to the base material by a conventional silk screening process. This process is extremely inexpensive and it can achieve the most complex and detailed patterns on the base material. Further, when the silk screening process is used to lay down the adhesive pattern, only a small amount of adhesive is needed to hold the plastic particles. This makes the base material, where it is a fabric, very light, and easy to roll or drape.

Where the above-described process is used on a fabric it gives rise to a novel decorative fabric on which the plastic beads are permanently affixed in any desired pattern. The beads and the fabric combine to make a relatively light finished article which can be folded, cut, rolled, sewn and draped with ease. Further, the finished decorative fabric can withstand washing and dry cleaning and has long-wearing qualities.

It is therefore an object of this invention to provide a process for making decorative bead-like articles and to achieve a product having a surface which is patterned in any desired form.

It is a further object of the invention to provide a comparatively light-weight material with a decorative beaded surface that can be readily used in wearing apparel.

It is yet another object of the invention to provide a material with a beaded surface in which stitching or cutting through the beaded patterns can be readily accomplished.

Still another object of the invention is to provide a decorative fabric utilizing plastic bead-like particles, the particles being held to the fabric by an adhesive.

Another object of the invention is to provide a decorative fabric having plastic bead-like particles affixed thereto in any desired pattern by the use of a plastisol.

Other objects and advantages of the present invention will become more apparent upon reference to the following specification and annexed drawings in which.

Figure 1:
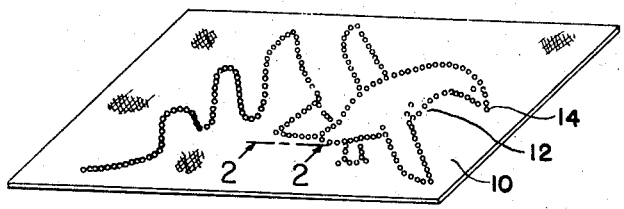
FIGURE 1 is a perspective view of a piece of decorative material made according to the present invention.
Figure 1A:
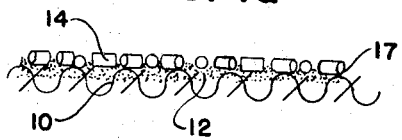
FIGURE 1A is a side elevational view, taken partially in section of a portion of the piece of material shown in FIGURE 1.

Referring first to FIGURES 1 and 1A, a piece of the finished article made according to the present invention is shown. The article is formed by a base material 10, which may be a fabric of the woven or nonwoven type made from any of the natural or synthetic fibers or combinations thereof. A layer of an adhesive 12 is shown and this adhesive may be applied onto the base material in any desired pattern or over the whole piece of material. Firmly affixed to the adhesive layer 12 are a plurality of plastic bead-like particles 14 which may be of any desired shape, size, color or combinations thereof. The product of FIGURE 1 has both highly decorative and practical characteristics as is described below.

Figure 2:
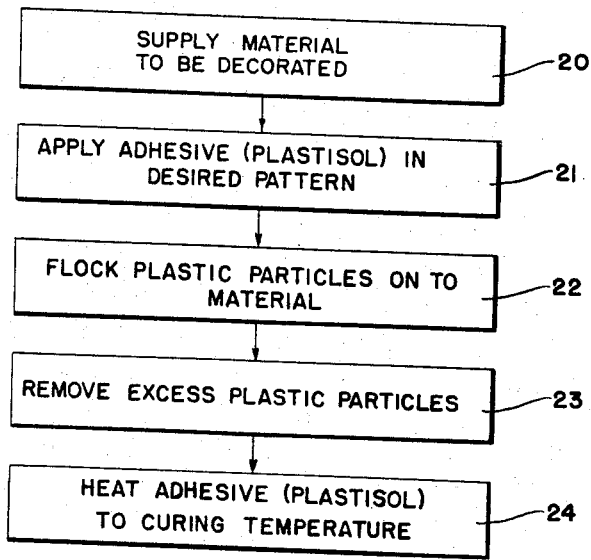
FIGURE 2 is a flow diagram showing the process for making the material.

In order to more fully explain the composition of the article of FIGURES 1 and 1A and how it is made, reference is made to FIGURE 2 which shows a flow diagram of a preferred process for making the article. As the first step 20, the base material 10 to be coated with the plastic bead-like particles is supplied. The base material may be of any suitable size and shape and of any desired color.

As the next step 21 in the process, the adhesive is applied to the base material 10 in any desired design or pattern. In the preferred form of the invention, the adhesive compound is a plastisol which is applied to the base material 10 in an environment in which the plastisol flows fairly freely. The plastisol may be applied by hand or through a sieve, stencil, screen, or other type of pattern-forming device to produce the desired pattern or design. As shown in FIGURE 1A, the adhesive penetrates between the pores of the base material so that it may be firmly fixed thereto.

Basically, plastisols are composed of vinyl chloride resin particles dispersed in a plasticizer to which may be added stabilizers, pigments, gelling agents and similar modifying additives. The formulation for plastisols usable with the present invention is quite wide. For example, based upon 100 parts by weight of vinyl chloride resin, the amount of plasticizer may vary from 50 parts to 200 parts and the amount of pigment, stabilizers and/or other modifying components may vary between 0 and 10 parts.

Typical examples of plastisols which may be used with the present invention are as follows:

(1)

| | Pounds |
|---|---|
| Polyvinyl chloride resin (QYNV) | 100 |
| Di iso octyl phthalate | 80 |
| Dibutyl tin maleate | 1 |

(2)

| | |
|---|---|
| Polyvinyl chloride resin (Geon 121) | 100 |
| Di octyl phthalate | 80 |
| Barium-Cadmium laurate | 1 |

(3)

| | |
|---|---|
| Polyvinyl chloride resin (Exon 654) | 100 |
| Tri cresyl phosphate | 80 |
| Tri basic lead stearate | 2 |

Plastisols made according to the above formulations have the characteristics of pliability and softness rather than the stiffness and hardness of other types of adhesives. They can be readily cut or sewn and they can withstand washing and dry cleaning and have good wearing characteristics. If desired, the plastisol may contain pigments in order to add further color to the overall decoration.

In the preferred embodiment of the invention a plastisol adhesive is applied to the base material by the use of a silk screening process in which the plastisol is pressed through the openings in the silk screen. As is well known, silk screens can be made to have extremely fine detail and hence, the pattern of adhesive formed on the base material by this process can be as complicated and detailed as the pattern formed on the silk screen. It has been found that the plastisol will flow freely through the silk screen and will not clog the openings therein. This permits the silk screen to be used over and over again to uniformly reproduce the same pattern. This detail of design and uniformity cannot be achieved with glass beads. Of course, it should be realized that the silk screening process is extremely economical and hence beaded articles made according to the present invention can be produced relatively cheaply. If desired, other types of pattern-forming devices such as stencils may be used to lay the pattern down on the base material or it may be done by hand. However, none of the other methods produces the results or the economies achieved with the silk screening process.

The next step 22 in the process is to apply the plastic particles onto the base material before the adhesive has dried or it is cured. This is accomplished by shaking or flocking the particles onto the adhesive-coated portion of the base material by hand or by using a suitable sieve. When the plastic particles are flocked onto the base material, they will stick to the wet adhesive-coated portions and a pattern of beads corresponding to the pattern of adhesive is laid down on the base material over the adhesive.

The plastic bead-like particles 14 are preferably made from lengths of extruded plastic which are cut into the desired shape and size. The plastic particles may be solid, hollow, flat or of any other desired configuration and they may be any color or combination of colors. In a preferred embodiment of the invention, the beads are made of a plastic from the polyvinyl group and are preferably polyvinyl chloride. Polyvinyl chloride particles are readily held by the plastisol adhesives referred to above. Additional suitable plastics may be selected for the beads from those plastic compounds having polymers obtained from polymerization of unsaturated compounds. Of course, the adhesive 12 is selected to hold the particular type of plastic particle being used.

The cut up plastic particles are relatively soft so that they can be cut or sewn through. However, they are also durable enough to maintain their luster and shape throughout their life and they can be dry cleaned or washed at normal temperatures. In addition, the plastic particles are relatively light so that a large number may be placed on a piece of base material without unduly weighing it down. Any combination of colors, shapes and/or sizes of plastic particles may be utilized on a single piece of base material as desired. Where the silk screening process and the plastisol is used, only a small amount of the plastisol is laid down on the base material. The plastic particles cover up the plastisol to a large extent so that it does not show through the plastisol and plastic particles add very little to the overall weight of the base material. All of these features make the finished article suitable for a wide variety of uses, including use as clothing material where the base material is a fabric.

After the plastic particles are applied to the base material 10, the excess particles which did not initially adhere to the base material are removed as per step 23. This may be accomplished by shaking the base material 10, by using air or gas to blow off the excess particles, by using vacuum cleaner type machine to pick up the excess particles, or by some other suitable means. In any event, only the excess particles are removed and those which initially adhered to the adhesive 12 are left for the final curing and setting step.

In order to firmly fix the plastic bead-like particles to the base material, a curing step 24 is utilized in which the adhesive and the particles are finally set. Where a plastisol is used as the adhesive, the plastisol is heated to its curing point, i.e. the temperature at which the polyvinyl chloride particles in the plastisol solidify. This is accomplished by placing the base material 10 on a heated plate or by placing it in an oven, or by using infra-red heating lamps, or by using any other suitable heating means. All of the plastisols described above have a heat curing temperature in the range of between 300° F. to 400° F. and all will adhere firmly to a fabric or other porous material by becoming firmly set in the pores, as shown in FIGURE 1A. It is preferred that a plastisol which cures at 350° F. and above be used so that the finished garment will withstand the highest temperatures usually encountered in a commercial dry cleaning process. As described, these plastisols have a suitable degree of flexibility which allows a piece of fabric on which they are coated to be rolled, shaped or sewn.

When the adhesive finally sets after it has been cured, the lower surfaces of the bead-like particles 14 are entrapped therein to firmly hold the particles to the adhesive coated portions of the base material. The curing temperature of the plastisols is preferably made high enough so that the lower surfaces of the particles also soften and/or melt slightly. Therefore, the plastisol and the particles become fused together and the particles are securely fastened to the base material. This is shown in FIGURE 1A at the points 17. Of course, the particles need not be melted since they are readily held by the finally set adhesive.

Aricles of the type shown in FIGURE 1 have been made according to the process of FIGURE 2 using fabrics as the base material. These articles have many desirable characteristics including, long wearing life, ability to withstand dry cleaning, and excellent draping appearance because of the lightweight of the plastic particles and the softness and flexibility of the plastisol used for the adhesive. Further, the articles can be rolled without the plastic particles becoming detached and the article and the plastic particles can be readily cut or sewn without damage to the cutting or sewing instruments and without the particles becoming detached. This particularly suits these articles to be used in clothing, handbags, shoes, scarves, etc.

Figure 3:
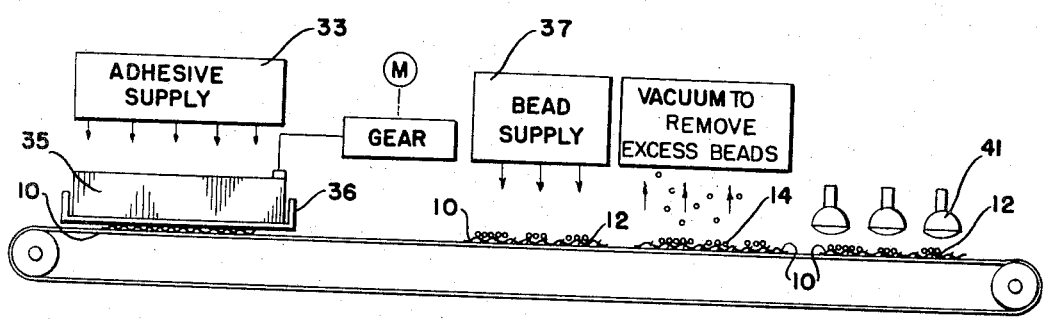
FIGURE 3 is a diagram showing apparatus for producing the decorative material in large quantities.

FIGURE 3 shows an arrangement for producing finished articles made according to the invention on a large scale. The arrangement includes a conveyor belt 30 which is driven either continuously or intermittently by a driving means 31. The base material 10 is laid on the belt 30 and the material is conveyed to a first station 33 where the adhesive is applied in the desired pattern to the base material through a silk screen 36 or other type of pattern-forming device. Where a plastisol is used, it is preferably applied from a tank 33. The plastisol or adhesive comes out of the tank and is pressed through the holes in the silk screen 36, which are in the shape of the desired decorative pattern, by a motor driven knife or other similar device 35. This is similar to the conventional silk screen process but an adhesive is applied instead of a dye. Where the entire surface of the base material is to be coated, the screen 36 is eliminated and the adhesive is applied over the whole surface of the base material.

The base material having the adhesive applied thereon in the desired pattern, is next passed to a bead supply station 37 where the plastic beads are flocked onto the base material. The plastic beads adhere only to the wet adhesive coated portions of the base material and the excessive beads are removed by a vacuum cleaner type device 39. Next, the base material is passed under a bank of heating lamps 41 which are used to cure the adhesive. As many lamps 41 are used and the base material is kept under these lamps for as long as it is necessary to cure the adhesive. After the adhesive is cured, the finished article is removed and the plastic particles are firmly affixed thereto in the desired pattern as laid down by the screen 36.

Therefore it can be seen that a novel decorative article and the process of making the same has been disclosed. The finished article has a raised bead-like surface which is highly decorative in appearance. Further, the finished article is relatively inexpensive to produce and it has many desirable properties.

Although a particular structure and process has been described it should be understood that the scope of the invention should not be considered to be limited by the particular embodiments of the invention shown by way of illustration, but rather by the appended claims.

What is claimed is:

1. A dry cleanable decorative flexible fabric article comprising:
   a fabric base material a flexible adhesive formed by a liquid dispersion of polyvinyl chloride particles, said adhesive laid down through a screen on said base material in a predetermined open-work pattern to permit general flexibility of the fabric in substantially all directions, a quantity of polyvinyl chloride tubular plastic particles of discrete size and shape each having only a portion thereof in contact with said adhesive, said adhesive and said polyvinyl chloride tubular plastic particles being cured such that said adhesive is adhered to said fabric, and said tubular plastic particles are integrally bonded to said adhesive at the point of contact, the remaining portion of each of the particles being free of said adhesive and extending above the base material and adhesive.

2. A decorative article as set forth in claim 1 wherein said adhesive is a plastisol.

3. A decorative fabric article as in claim 2 wherein the said particles are laid thereon to form substantially only a single layer of particles on the open-work pattern of plastisol.

4. The method of making a dry-cleanable decorative flexible fabric article comprising the steps of:

applying to a fabric base material a flexible adhesive formed by a liquid dispersion of polyvinyl chloride particles through a silk screen in a predetermined open-work pattern permitting general flexibility of the fabric in substantially all directions, placing polyvinyl chloride tubular plastic particles of discrete size and shape on said adhesive with only a portion of each of said particles in contact with the adhesive, heating said adhesive to its curing temperature, to give a permanent set to the base material, and melting only that portion of the polyvinyl chloride tubular plastic particles in contact with said adhesive making the particles integral with said adhesive to fixedly hold the particles to said adhesive by the portions thereof in contact with the adhesive, the remaining portions of the particles being free of the adhesive and extending thereabove.

5. The method of claim 4 wherein the adhesive is a plastisol and the heat curing of the plastisol takes place at or above 300° F.

References Cited

UNITED STATES PATENTS

| 823,445 | 6/1905 | Schramm | 117—25 |
|---|---|---|---|
| Re. 18,351 | 2/1932 | Hanington | 117—25 |
| 2,218,909 | 10/1940 | Gill | 117—33 |
| 2,378,252 | 6/1945 | Staehle et al. | 117—33 X |
| 2,444,863 | 7/1948 | Tornberg | 117—13 |
| 2,582,132 | 1/1952 | Kaplan | 117—21 X |
| 2,668,787 | 2/1954 | Schramm | 117—21 X |
| 2,735,786 | 2/1956 | Schramm | 117—21 X |
| 2,827,727 | 3/1958 | Lipsius. | |
| 2,946,911 | 7/1960 | Malinowski et al. | 117—18 X |
| 3,152,002 | 10/1964 | Wisotsky et al. | 117—21 |

FOREIGN PATENTS

| 708,055 | 4/1954 | Great Britain. |
| 222,844 | 11/1958 | Australia. |
| 589,865 | 7/1925 | France. |

WILLIAM D. MARTIN, *Primary Examiner.*

P. ATTAGUILE, *Assistant Examiner.*